United States Patent
Naniwa et al.

(10) Patent No.: US 8,526,274 B2
(45) Date of Patent: Sep. 3, 2013

(54) THERMALLY ASSISTED MAGNETIC RECORDING DEVICE

(75) Inventors: Irizo Naniwa, Fujisawa (JP); Takuya Matsumoto, Sunnyvale, CA (US); Yukio Kato, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/153,073

(22) Filed: Jun. 3, 2011

(65) Prior Publication Data

US 2011/0299367 A1     Dec. 8, 2011

(30) Foreign Application Priority Data

Jun. 7, 2010   (JP) ................................. 2010-129950

(51) Int. Cl.
*G11B 11/00*     (2006.01)

(52) U.S. Cl.
USPC ........................................ 369/13.33; 360/59

(58) Field of Classification Search
USPC ..................... 369/13.33; 360/59, 75, 294.7
See application file for complete search history.

(56) References Cited

U.S. PATENT DOCUMENTS

| | | | |
|---|---|---|---|
| 6,963,464 B2 | 11/2005 | Xu et al. | |
| 7,027,250 B2 | 4/2006 | Lau | |
| 7,509,728 B1 * | 3/2009 | Schreck et al. | 29/603.03 |
| 7,706,098 B2 * | 4/2010 | Sato | 360/75 |
| 7,724,463 B2 * | 5/2010 | Nakamura et al. | 360/75 |
| 7,855,937 B2 | 12/2010 | Shimazawa et al. | |
| 2003/0174430 A1 * | 9/2003 | Takahashi et al. | 360/75 |
| 2007/0139818 A1 | 6/2007 | Shimazawa et al. | |
| 2009/0040645 A1 * | 2/2009 | Shimazawa et al. | 360/59 |
| 2009/0262608 A1 | 10/2009 | Kurita et al. | |

FOREIGN PATENT DOCUMENTS

| | | |
|---|---|---|
| JP | 7-006309 | 1/1995 |
| JP | 2001-056948 A | 2/2001 |
| JP | 2003-338011 A | 11/2003 |
| JP | 2006-190473 A | 7/2006 |
| JP | 2007-193906 A | 8/2007 |
| JP | 2009-043377 | 2/2009 |
| JP | 2009-259359 A | 11/2009 |
| JP | 2010-061782 A | 3/2010 |

\* cited by examiner

*Primary Examiner* — Joseph Feild
*Assistant Examiner* — Andrew Sasinowski
(74) *Attorney, Agent, or Firm* — Foley & Lardner LLP

(57) ABSTRACT

There is provided a thermally assisted magnetic recording device capable of preventing collision between a thermally assisted magnetic recording head and a disk due to thermal deformation of a near-field transducer. The thermally assisted magnetic recording device includes a temperature sensor for measuring the temperature in the vicinity of the near-field transducer, a table that stores the relationship between temperature and deformation in the vicinity of the near-field transducer, and a control unit. The control unit calculates the deformation in the vicinity of the near-field transducer, from the temperature measured by the temperature sensor and the relationship between temperature and deformation stored in the table. Then, the control unit drives the flying height control actuator according to the calculated deformation to control the distance between the thermally assisted magnetic recording and the disk in order to avoid contact between them.

7 Claims, 8 Drawing Sheets

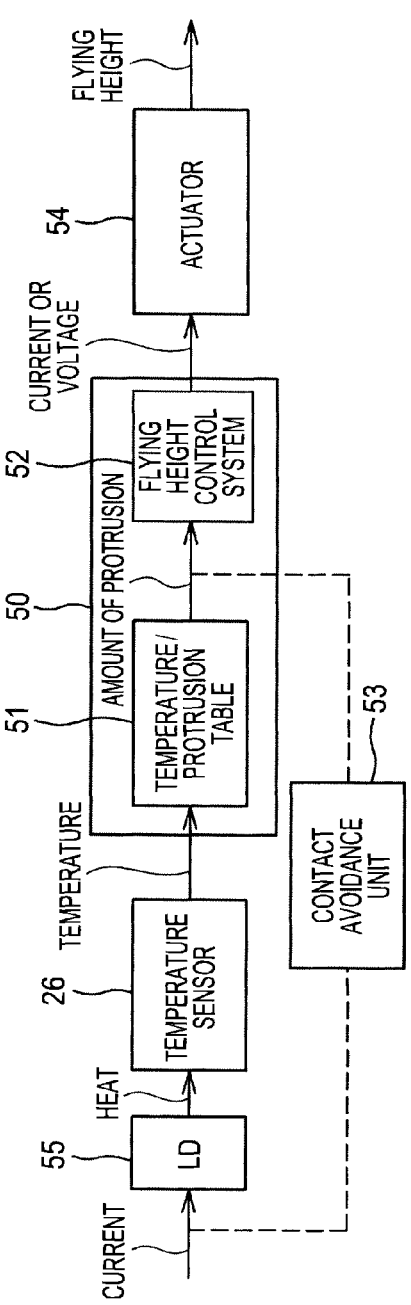
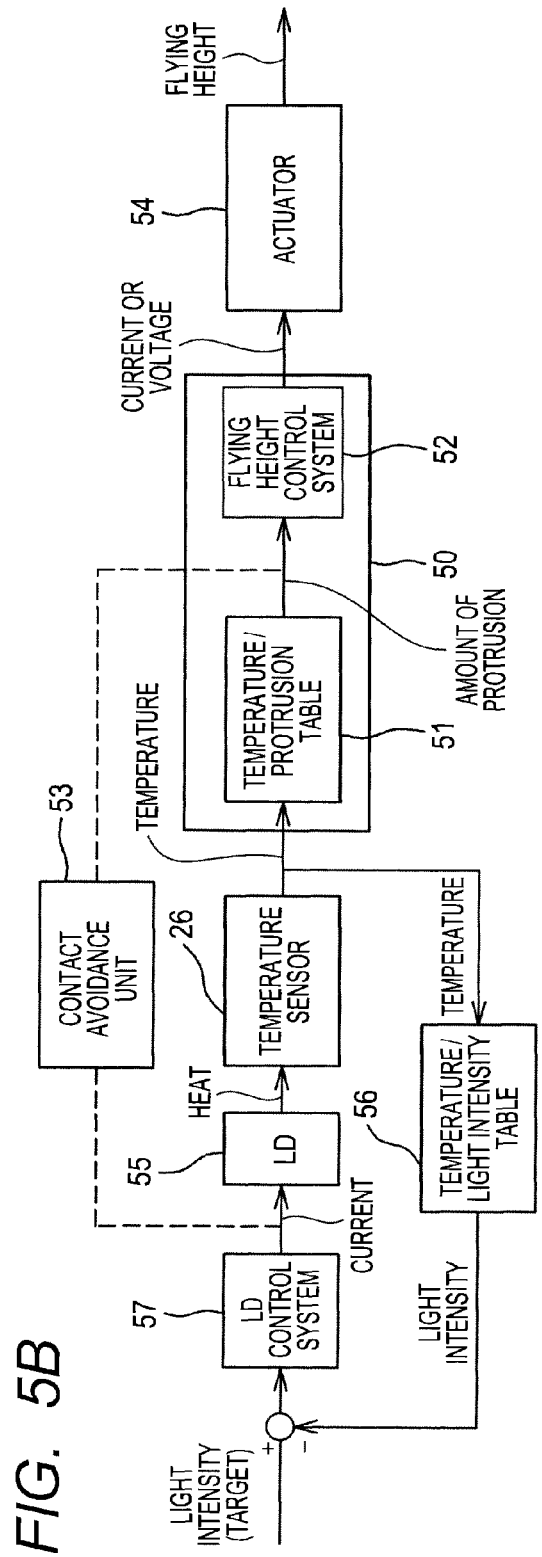
FIG. 5A
FIG. 5B

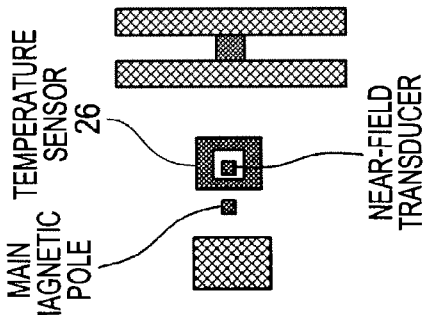
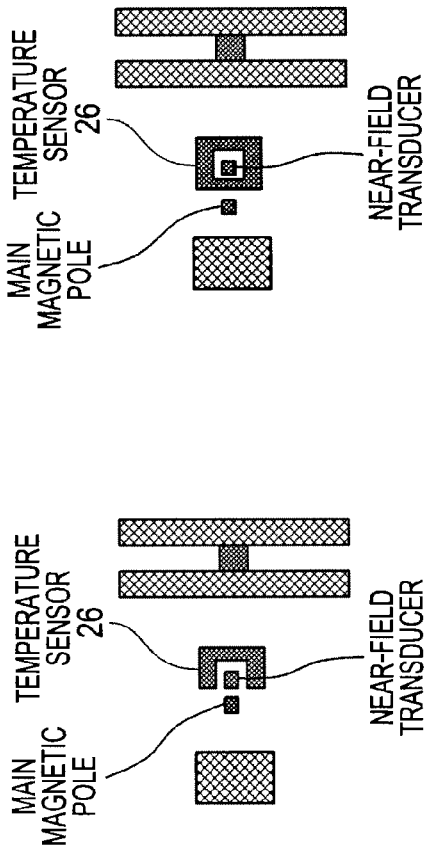
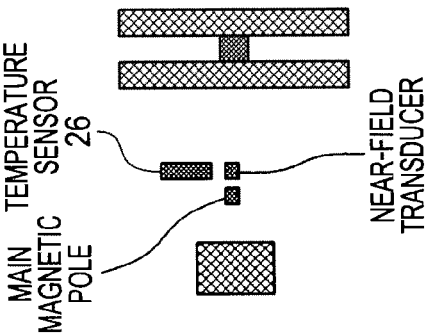
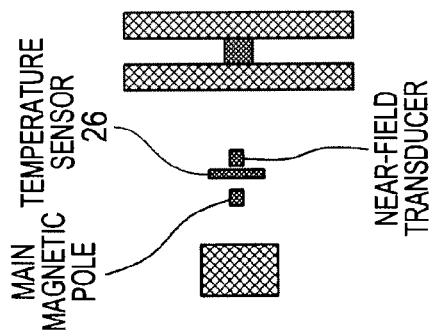
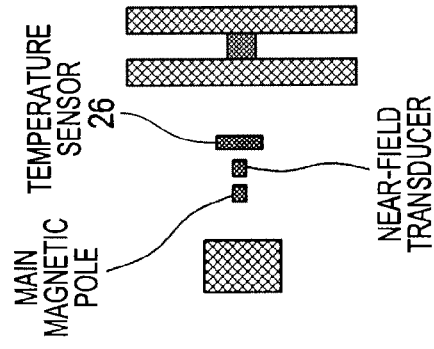

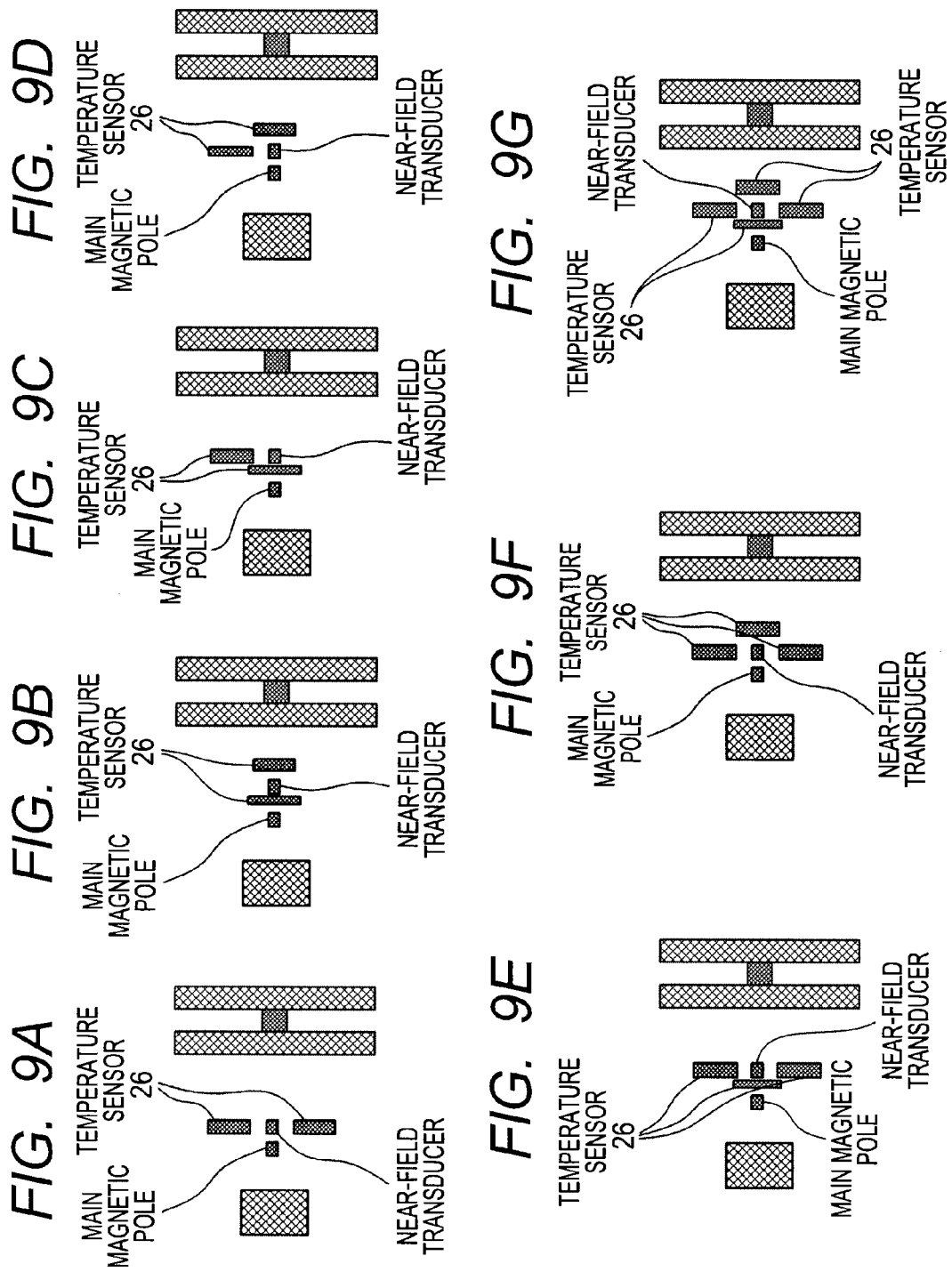

THERMALLY ASSISTED MAGNETIC RECORDING DEVICE

CLAIM OF PRIORITY

The present application claims priority from Japanese patent application JP2010-129950 filed on Jun. 7, 2010, the content of which is hereby incorporated by reference into this application.

BACKGROUND OF THE INVENTION

1. Field of the Invention

The present invention relates to a thermally assisted magnetic recording device. More particularly, the present invention relates to a thermally assisted magnetic recording device provided with a means for preventing a thermally assisted magnetic head from colliding with a disk due to thermal deformation of a near-field transducer (NFT), and for keeping the distance constant between the thermally assisted magnetic recording head and the disk.

2. Description of the Related Art

One technique for significantly increasing the recording density of a magnetic disk is called thermally assisted magnetic recording. Thermally assisted magnetic recording is designed to record data onto a disk by applying heat over 200 degrees C. and magnetic field to a micro area of about tens of nm×tens of nm in the disk. One proposed means for heating such a micro area is to convert a laser beam into near-field light by a near-field transducer provided in the vicinity of a main magnetic pole.

However, there is only several percent of the applied laser power in the thermally assisted magnetic recording head that can be converted into the near-field light by the near-field transducer, and can contribute to the heating of the disk. The rest of the laser power is absorbed and converted into heat by members constituting the near-field transducer. The near-field transducer is covered with an alumina thin film having a low thermal conductivity, thereby trapping heat inside. The vicinity of the near-field transducer is heated to a very high temperature, reaching as high as 1000 degrees C. locally. Because of this high temperature, thermal deformation occurs in the vicinity of the near-field transducer. As a result of this thermal deformation, the thermally assisted magnetic recording head may collide with the disk, causing wear and contamination to the near-field transducer. Thus, there is a risk that the near-field transducer may be damaged. In addition, the change in the distance between the thermally assisted magnetic recording head and the disk due to the thermal deformation hampers stable magnetic recording.

A known example of such a thermally assisted magnetic recording device has been disclosed in Japanese Patent Application Laid-Open Publication No. 2009-43377.

In the thermally assisted magnetic recording device disclosed in Japanese Patent Application Laid-Open Publication No. 2009-43377, a temperature sensor is provided in the vicinity of a laser diode (hereinafter referred to as LD), which is a light source, to stabilize the intensity of the laser beam from the LD.

When a current flows through the LD, the temperature of the LD itself increases due to self heating. At this time, the intensity of the laser beam emitted from the LD varies depending on the temperature of the LD. Thus, the intensity of the laser beam reaching the near-field transducer varies during operation. As a result, the disk may not be heated constantly.

Thus, in Japanese Patent Application Laid-Open Publication No. 2009-43377, the temperature of the LD is measured by a temperature sensor to control the current flowing through the LD based on the measured temperature, in order to keep the intensity of the laser beam constant.

BRIEF SUMMARY OF THE INVENTION

The conventional technique disclosed in Japanese Patent Application Laid-Open Publication No. 2009-43377 is to control the change in the intensity of the laser beam reaching the near-field transducer. Thus, it is not designed to prevent collision with the disk due to thermal deformation of the near-field transducer, nor to keep the distance constant between the thermally assisted magnetic recording head and the disk. Further, the temperature is measured in the vicinity of the LD outside the thermally assisted magnetic recording head, and not in the vicinity of the near-field transducer inside the thermally assisted magnetic recording head. In addition, the temperature sensor is located in the vicinity of the LD and not in the vicinity of the near-field transducer.

Accordingly, it is desirable to provide a thermally assisted magnetic recording device capable of preventing thermally assisted magnetic recording head from colliding with a disk due to thermal deformation of a near-field transducer, and keeping the distance constant between the thermally assisted magnetic recording head and the disk.

In order to achieve the above object, the present invention uses the following means.

A thermally assisted magnetic recording device according to the present invention includes: a disk for recording information; a main magnetic pole; a coil for generating magnetic field from the main magnetic pole; a read element; a near-field transducer provided in the vicinity of the main magnetic pole; a waveguide for guiding light to the near-field transducer; an actuator for controlling the flying height; and a thermally assisted magnetic recording head integrally formed with a slider flying over the rotating disk. The thermally assisted magnetic recording device also includes a temperature sensor, a table, and a control unit. The temperature sensor measures the temperature in the vicinity of the near-field transducer. The table stores the relationship between temperature and amount of deformation in the vicinity of the near-field transducer. The control unit calculates the amount of deformation in the vicinity of the near-field transducer, based on the temperature measured by the temperature sensor, and on the relationship between temperature and amount of deformation stored in the table. Then, the control unit drives the actuator according to the obtained amount of deformation to control the distance between the thermally assisted magnetic recording head and the disk, in order to avoid contact between the thermally assisted magnetic recording head and the disk.

In the thermally assisted magnetic recording device according to the present invention, the temperature sensor includes a resistive element formed in the vicinity of the near-field transducer, and a circuit for measuring the resistance from the change in the current flowing through the resistive element.

Further, in the thermally assisted magnetic recording device according to the present invention, the actuator for controlling the flying height includes a metal body and a circuit for causing the current to flow through the metal body. This actuator is implemented as a thermal actuator for thermally deforming a portion of the thermally assisted magnetic recording head by the joule heat generated in the metal body by causing the current to flow through the metal body. In other words, the actuator controls the current flowing through the metal body in order to control the distance between the thermally assisted magnetic recording head and the disk.

Still further, in the thermally assisted magnetic recording device according to the present invention, the actuator for controlling the flying height includes a piezoelectric element and a circuit for applying voltage to the piezoelectric element. The actuator moves a portion of the thermally assisted magnetic recording head in the flying direction by the electrostriction which occurs when voltage is applied to the piezoelectric element. In other words, the actuator controls the voltage applied to the piezoelectric element in order to control the distance between the thermally assisted magnetic recording head and the disk.

Still further, in the thermally assisted magnetic recording device according to the present invention, the near-field transducer is supplied with light from the LD.

Still further, the thermally assisted magnetic recording device according to the present invention also includes a table and an LD control unit. The table stores the relationship between temperature and laser light intensity in the vicinity of the near-field transducer. The LD control unit calculates the laser light intensity, based on the temperature measure by the temperature sensor, and on the relationship between temperature and laser light intensity stored in the table. Then, the LD control unit controls the light intensity of the LD to be constant by controlling the LD according to the laser light intensity.

Still further, the thermally assisted magnetic recording device according to the present invention also includes a contact avoidance unit. When the obtained amount of deformation exceeds the control range of the actuator, the contact avoidance unit forcibly blocks or reduces the current supplied to the LD.

According to the present invention, it is possible to prevent the thermally assisted magnetic recording head from colliding with the disk due to thermal deformation of the near-field transducer, and to keep the distance constant between the thermally assisted magnetic recording head and the disk.

Further, in accordance with the configuration according to the present invention, it is possible to prevent the near-field transducer itself from being damaged due to wear and contamination. In addition, constant thermally assisted magnetic recording can be ensured.

BRIEF DESCRIPTION OF THE DRAWINGS

FIG. 5A is a block diagram of a flying height control system of the magnetic head according to the present invention;

FIG. 5B is a block diagram of the flying height control system of the magnetic head, in which the laser light intensity is taken into account, according to the present invention;

FIGS. 8A to 8E are views showing examples of temperature sensor arrangement in the case of providing one temperature sensor; and FIGS. 9A to 9G are views showing examples of temperature sensor arrangement in the case of providing a plurality of temperature sensors.

DETAILED DESCRIPTION OF THE INVENTION

Hereinafter, preferred embodiments of the present invention will be described with reference to the accompanying drawings.

Figure 1:
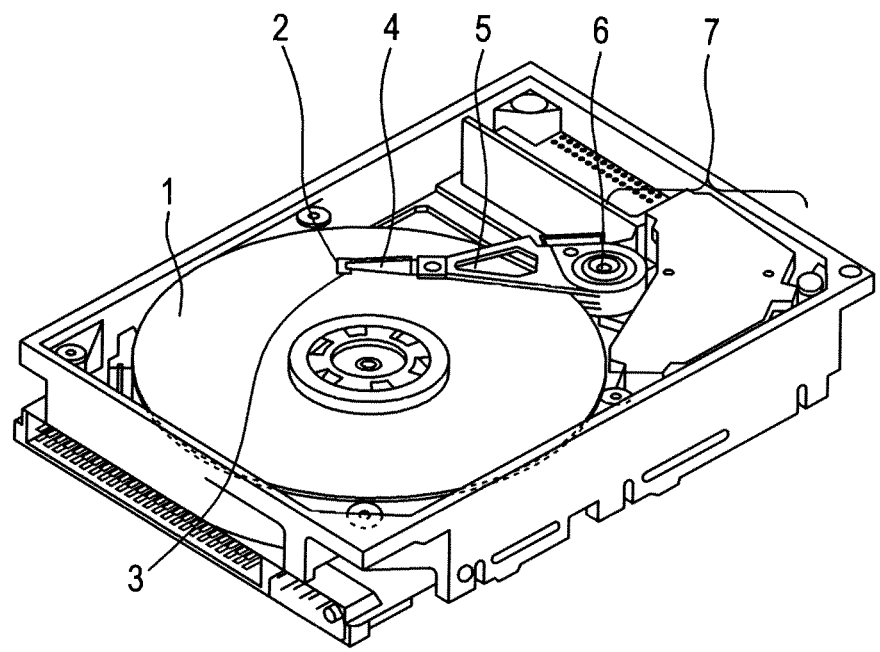
FIG. 1 is a perspective view of a magnetic disk device to which the present invention is applied.

FIG. 1 is a perspective view showing the inside of a magnetic disk device to which the present invention is applied.

In this figure, a disk 1 is rotatably supported. A thermally assisted magnetic recording head 2 is mounted to a slider 3, flying over the recording surface of the disk 1 at a predetermined distance. The slider 3 is supported by a suspension 4. The suspension 4 is supported by a carriage arm 5. The carriage arm 5 is swingably supported by a pivot 6 as a rotation axis.

Driving a voice coil motor 7 causes the carriage arm 5 to swing to move the magnetic head 2 onto a desired track of the rotating disk 1, in order to record and read information.

Figure 2:
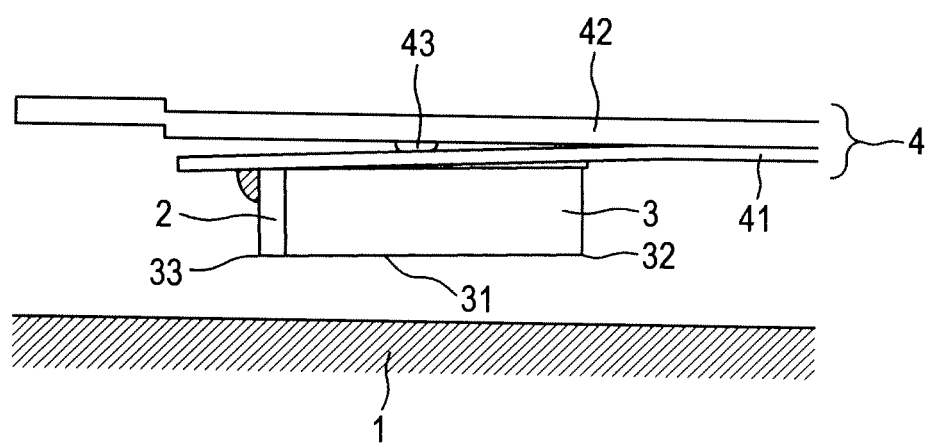
FIG. 2 is a side view in the vicinity of a magnetic head according to the present invention.

FIG. 2 is an enlarged side view in the vicinity of the thermally assisted magnetic recording head 2 of FIG. 1.

In this figure, the suspension 4 includes a flexure 41 and a load beam 42. The slider 3 is connected to the flexure 41. The slider 3 receives a pressing force toward the disk 1 from the load beam 42 through a dimple 43 formed in the load beam 42.

Further, an air bearing surface 31 of the slider 3 has a groove not shown. When a rotational flow of the disk 1, which flows from a leading edge 32 of the slider 3 to a trailing edge 33 thereof, enters between the disk 1 and the slider 3, positive pressure and negative pressure are generated locally. With the positive and negative pressures as well as the force received from the load beam 42, the slider 3 can fly over the disk 1 constantly at a distance of several nanometers.

First Embodiment

Next, a first embodiment of the thermally assisted magnetic recording head according to the present invention will be described with reference to FIGS. 3 and 4.

Figure 3:
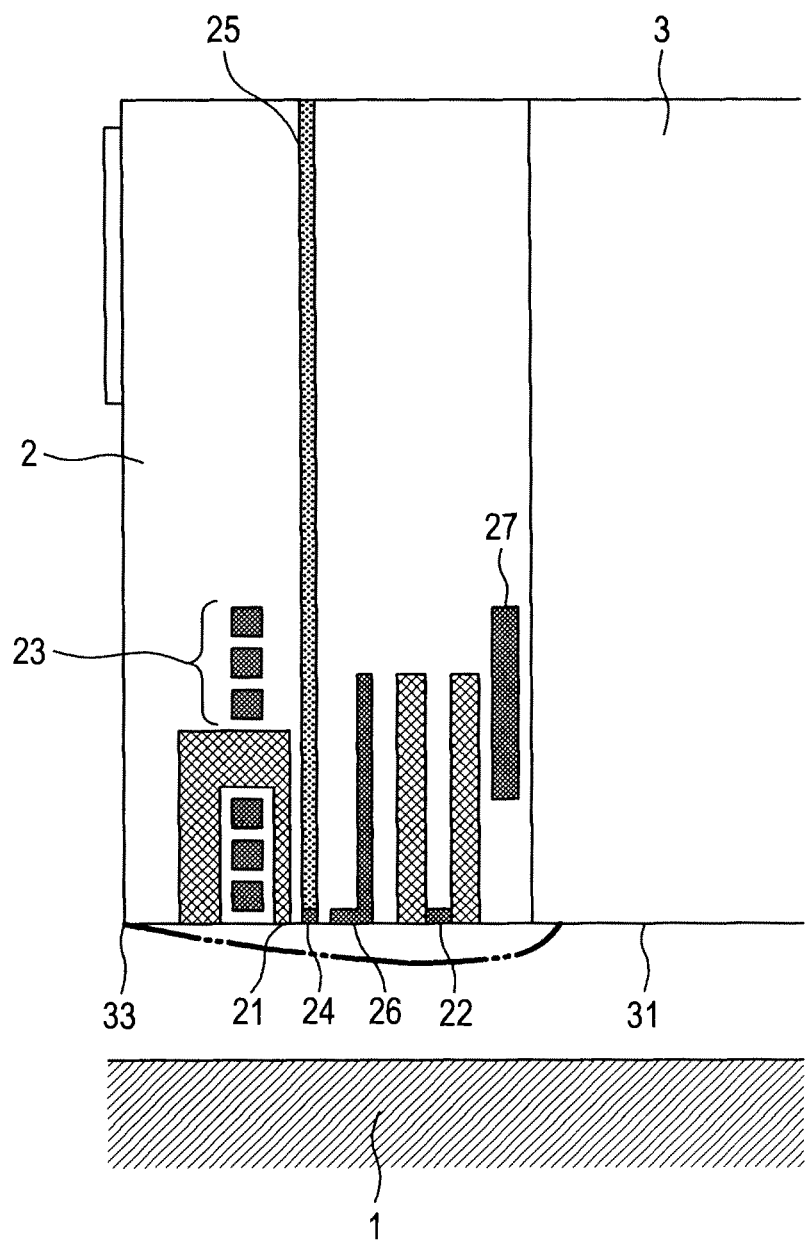
FIG. 3 is a cross-sectional view of the magnetic head according to a first embodiment of the present invention.

FIG. 3 is a cross-sectional view of the thermally assisted magnetic recording head 2, taken along a section including a line connecting the middle point of the leading edge 32 and the middle point of the trailing edge 33 in the slider shown in FIG. 2.

Figure 4:
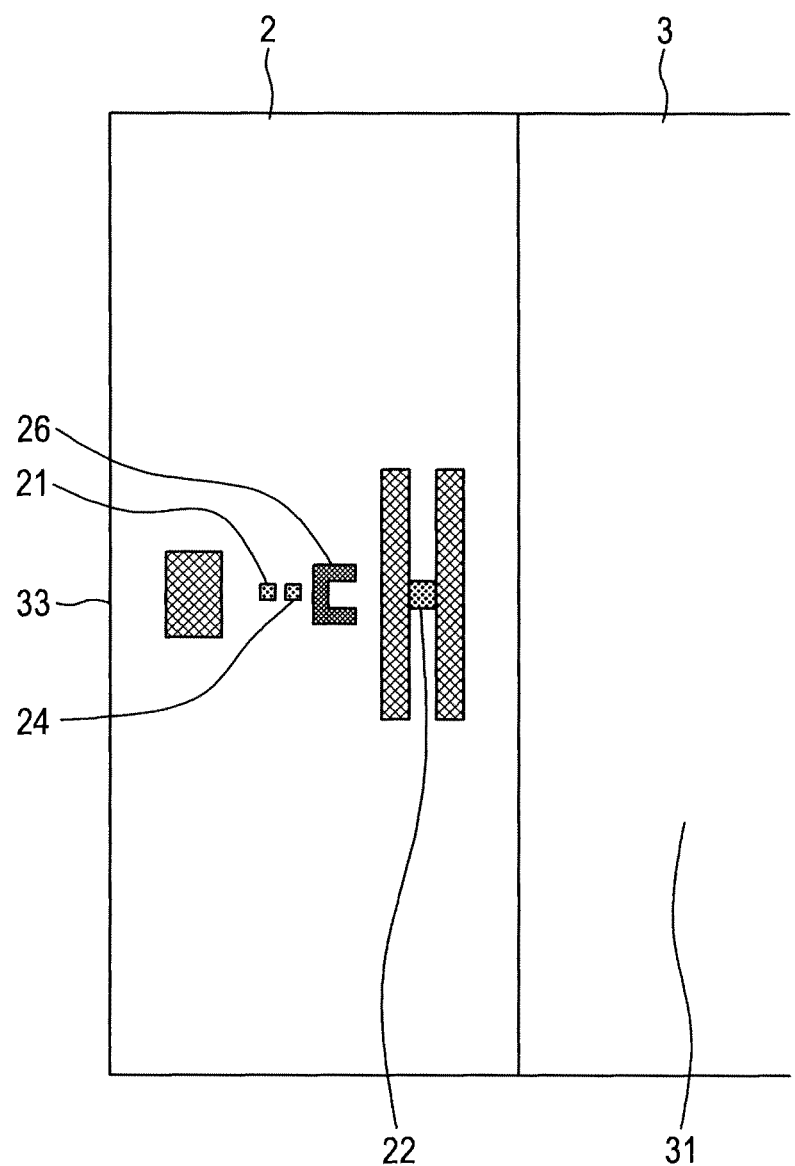
FIG. 4 is a view of the magnetic head according to the first embodiment of the present invention, as viewed from the air bearing surface.

FIG. 4 is a view of the thermally assisted magnetic recording head 2 viewed from the side of the air bearing surface 31.

The thermally assisted magnetic recording head 2 includes a main magnetic pole 21, a read element 22, a coil 23 for generating magnetic field from the main magnetic pole 21, a near-field transducer 24, a waveguide 25 for guiding a laser beam to the near-field transducer 24, a temperature sensor 26, and a thermal flying-height control (TFC) coil 27.

The near-field transducer 24 is formed in the vicinity of the main magnetic pole 21.

The temperature sensor 26 is formed in the vicinity of the near-field transducer 24. The temperature sensor 26 measures the temperature in the vicinity of the near-field transducer 24.

The TFC coil 27 expands the magnetic head 2 by the joule heat generated by controlling the current flowing through the TFC coil 27, in order to control the amount of protrusion of the magnetic head. The TFC coil 27 is a type of thermal actuator.

FIG. 5A is a block diagram of a control system for controlling the flying height of the magnetic head. A control circuit 50 includes a table (temperature/protrusion table) 51 and a flying height control system 52. The temperature/protrusion table 51 stores in advance the relationship between temperature and amount of protrusion in the vicinity of the near-field transducer. The flying height control system 52 controls the current flowing through the actuator 54 such as the TFC coil 27. In this figure, when the amount of protrusion exceeds the control range of the actuator 54, the contact avoidance unit 53 forcibly blocks or reduces the current supplied to the LD 55. In this way, it is possible to prevent the magnetic head from colliding with the disk. The temperature/protrusion table is stored, for example, in a nonvolatile recording medium.

The operation of this embodiment is as follows. First, a laser beam is guided to the near-field transducer 24 through the waveguide 25. Then, a near-field light is generated in the near-field transducer 24 to heat the disk 1 locally, in order to reduce the magnetic coercive force of the heated area. At the same time, a magnetic field is generated at the end portion of the main magnetic pole 21 by causing current to flow through the coil 23. Thus, information is recorded on the disk by reversing the magnetization of the end portion of the main magnetic pole 21.

However, in this case, only several percent of the input laser power can be converted to the near-field light by the near-field transducer 24. The remaining laser power is absorbed into the members constituting the near-field transducer 24. Further, the near-field transducer 24 is covered with an alumina film having a low thermal conductivity. Thus, the near-field transducer 24 traps heat inside, reaching a very high temperature locally. Because of this high temperature, local thermal deformation (protrusion) occurs in the vicinity of the near-field transducer 24. As a result of this thermal deformation, the thermally assisted magnetic recording head 2 may collide with the disk 1, causing wear and contamination to the near-field transducer 24. Thus, the near-field transducer 24 may be damaged. In addition, the change in the distance between the thermally assisted magnetic recording head 2 and the disk 1 due to the thermal deformation hampers stable magnetic recording.

In this embodiment, the temperature sensor 26 measures the temperature in the vicinity of the near-field transducer 24, to estimate the local thermal deformation in the vicinity of the near-field transducer 24 based on the temperature/protrusion table 51. Then, the flying height control system 52 controls the amount of expansion of the magnetic head by controlling the current flowing through the TFC coil 27 according to the estimated amount of deformation. In this way, it is possible to keep the distance constant between the thermally assisted magnetic recording head 2 and the disk 1, and to avoid contact between the thermally assisted magnetic recording head 2 and the disk 1.

In this embodiment, a resistance thermometer bulb using a metal wire is used as the temperature sensor 26. However, other types of sensors may also be used, such as a thermistor using the semiconductor resistive element and a thermocouple using the Seebeck effect.

FIG. 5A shows a control system in which only the flying height control of the magnetic head is taken into account. FIG. 5B shows a control system in which the laser light intensity control is taken into account, in addition to the flying height control of the magnetic head. In FIG. 5B, a temperature/light intensity table 56 and an LD control system 57 are added to the configuration of the control system shown in FIG. 5A.

In addition to the operation of FIG. 5A, the control system of FIG. 5B can perform the following operation. The temperature sensor 26 measures the temperature to estimate the light intensity based on the temperature/light intensity table 56. Then, the LD control system 57 controls the current flowing through the LD 55 in order to control the laser light intensity to be constant.

Second Embodiment

A second embodiment uses a piezoelectric element as the actuator 54 for controlling the amount of protrusion of the magnetic head 2.

The second embodiment of the thermally assisted magnetic recording head according to the present invention will be described with reference to FIGS. 6 and 7.

Figure 6:
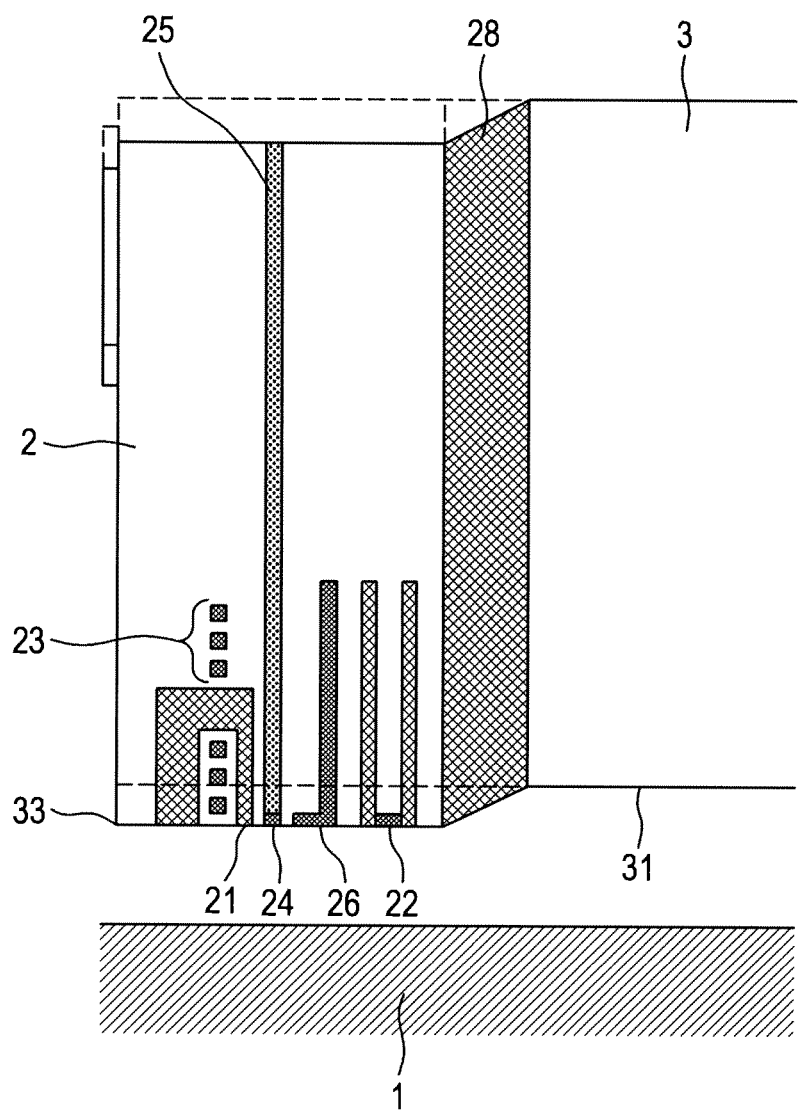
FIG. 6 is a cross-sectional view of a magnetic head according to a second embodiment of the present invention.

FIG. 6 is a cross-sectional view of the thermally assisted magnetic recording head 2, taken along a section including a line connecting the middle point of the leading edge 32 and the middle point of the trailing edge 33 in the slider shown in FIG. 2.

Figure 7:
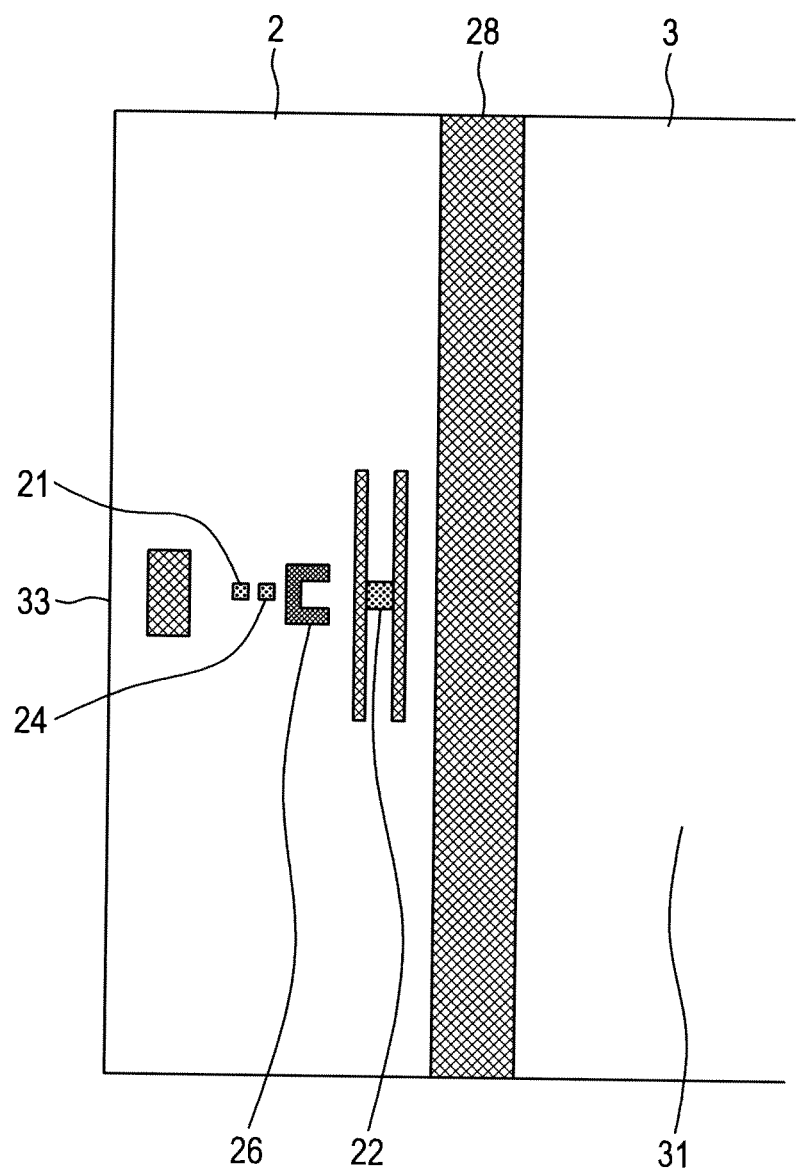
FIG. 7 is view of the magnetic head according to the second embodiment of the present invention, as viewed from the air bearing surface.

FIG. 7 is a view of the thermally assisted magnetic recording head 2 viewed from the side of the air bearing surface 31.

The thermally assisted magnetic recording head 2 includes the main magnetic pole 21, the read element 22, the coil 23 for generating a magnetic field from the main magnetic pole 21, the near-field transducer 24, the waveguide 25 for guiding a laser beam to the near-field transducer 24, the temperature sensor 26, and a PZT 28 which is sheared when an electric field is applied.

The near-field transducer 24 is formed in the vicinity of the main magnetic pole 21.

The temperature sensor 26 is formed in the vicinity of the near-field transducer 24. The temperature sensor 26 measures the temperature in the vicinity of the near-field transducer 24.

The PZT 28 controls the voltage applied to the PZT 28 in order to control the amount of protrusion of the magnetic head 2 as indicated by the solid and dotted lines in FIG. 6. The PZT 28 is a type of actuator.

It is to be noted that the same control circuit as that shown in FIG. 5A or 5B can be used.

In this embodiment, the temperature sensor 26 measures the temperature in the vicinity of the near-field transducer 24, to estimate the local thermal deformation in the vicinity of the near-field transducer 24 based on the temperature/protrusion table 51. Then, the flying height control system 52 controls the shear deformation of the PZT 28 by controlling the voltage applied to the PZT 28 according to the estimated amount of deformation. In this way, it is possible to keep the distance constant between the thermally assisted magnetic recording head 2 and the disk 1, and to avoid contact between the thermally assisted magnetic recording head 2 and the disk 1.

In this embodiment, a resistance thermometer bulb using a metal wire is used as the temperature sensor. However, other types of sensors may also be used, such as a thermistor using the semiconductor resistive element, and a thermocouple using the Seebeck effect.

FIGS. 8A to 8E and FIGS. 9A to 9G are views showing the temperature sensor configuration and arrangement, which is different from the first and second embodiments. FIGS. 8A to 8E show the case using a single temperature sensor. FIGS. 9A to 9G show the case using plural temperature sensors.

In FIG. 8A, a temperature sensor is arranged so as to surround three sides of the near-field transducer. In FIG. 8B, a temperature sensor is arranged so as to surround all sides of the near-field transducer. In FIG. 8C, a temperature sensor is provided on the side of the read element of the near-field transducer. In FIG. 8D, a temperature sensor is provided between the near-field transducer and the main magnetic pole. In FIG. 8E, a temperature sensor is provided on one side of the near-field transducer.

In FIG. 9A, two temperature sensors are provided on both sides of the near-field transducer. In FIG. 9B, two temperature sensors are provided in the front and back of the near-field transducer. In FIG. 9C, one temperature sensor is provided on one side of the near-field transducer and another temperature sensor is provided between the near-field transducer and the main magnetic pole. In FIG. 9D, one temperature sensor is provided on one side of the near-field transducer, and another temperature sensor is provided between the near-field transducer and the read element. In FIG. 9E, two temperature sensors are provided on both sides of the near-field transducer, and one temperature sensor is provided between the near-field transducer and the main magnetic pole. In FIG. 9F, two temperature sensors are provided on both sides of the near-field transducer, and one temperature sensor is provided between the near-filed transducer and the read element. In FIG. 9G, two temperature sensors are provided on both sides of the near-field transducer, and two temperature sensors are provided in the front and back of the near-field transducer.

What is claimed is:

1. A thermally assisted magnetic recording device comprising:
   a disk that records information; and
   a thermally assisted magnetic recording head integrally formed with a slider flying over the rotating disk,
   wherein the thermally assisted magnetic recording head includes:
   a main magnetic pole;
   a coil that is configured to generate a magnetic field from the main magnetic pole;
   a read element;
   a near-field transducer provided in the vicinity of the main magnetic pole;
   a waveguide that is configured to guide light to the near-field transducer; and
   an actuator that is configured to control the flying height,
   wherein the thermally assisted magnetic recording device further includes:
   a temperature sensor that is configured to measure the temperature in the vicinity of the near-field transducer, wherein the temperature sensor is positioned adjacent to the near-field transducer without the coil or read element being between the temperature sensor and the near-field transducer;
   a table that is configured to store the relationship between temperature and amount of deformation in the vicinity of the near-field transducer; and
   a control unit,
   wherein the control unit is configured to calculate the amount of deformation, based on the temperature measured by the temperature sensor, and on the relationship between temperature and amount of deformation stored in the table;
   wherein the control unit is configured to drive the actuator according to the obtained amount of deformation to control the distance between the thermally assisted magnetic recording head and the disk, in order to avoid contact between the thermally assisted magnetic recording head and the disk.

2. The thermally assisted magnetic recording device according to claim 1,
   wherein the temperature sensor includes a resistive element formed in the vicinity of the near-field transducer, and a circuit configured to measure the resistance from the change in the current flowing through the resistive element.

3. The thermally assisted magnetic recording device according to claim 1,
   wherein the actuator is configured to control the flying height, and includes a metal body and a circuit for causing a current to flow through the metal body,
   wherein the actuator is implemented as a thermal actuator that is configured to thermally deform a portion of the thermally assisted magnetic recording head by the joule heat generated in the metal body by causing a current to flow through the metal body,
   wherein the actuator is configured to control the current flowing through the metal body in order to control the distance between the thermally assisted magnetic recording head and the disk.

4. The thermally assisted magnetic recording device according to claim 1,
   wherein the actuator that is configured to control the flying height includes a piezoelectric element and a circuit that is configured to apply voltage to the piezoelectric element,
   wherein the actuator is configured to move a portion of the thermally assisted magnetic recording head in the flying direction by the electrostriction which occurs when voltage is applied to the piezoelectric element,
   wherein the actuator is configured to control the voltage applied to the piezoelectric element in order to control the distance between the thermally assisted magnetic recording head and the disk.

5. The thermally assisted magnetic recording element according to claim 1,
   wherein the near-field transducer is supplied with light from an LD.

6. The thermally assisted magnetic recording device according to claim 5, further comprising:
   a table that is configured to store the relationship between temperature and laser light intensity in the vicinity of the near-field transducer; and
   an LD control unit,
   wherein the LD control unit is configured to calculate the laser light intensity, based on the temperature measured by the temperature sensor, and on the relationship between temperature and laser light intensity stored in the table,
   wherein the LD control unit is configured to control the LD according to the laser light intensity in order to control the light intensity of the LD to be constant.

7. A thermally assisted magnetic recording device comprising:
   a disk that is configured to record information;
   a contact avoidance unit; and
   a thermally assisted magnetic recording head integrally formed with a slider flying over the rotating disk,
   wherein the thermally assisted magnetic recording head includes:
   a main magnetic pole;
   a coil that is configured to generate a magnetic field from the main magnetic pole;
   a read element;
   a near-field transducer provided in the vicinity of the main magnetic pole;

a waveguide that is configured to guide light to the near-field transducer; and an actuator that is configured to control the flying height, wherein the thermally assisted magnetic recording device further includes:

a temperature sensor that is configured to measure the temperature in the vicinity of the near-field transducer;

a table that is configured to store the relationship between temperature and amount of deformation in the vicinity of the near-field transducer; and a control unit, wherein the control unit is configured to calculate the amount of deformation, based on the temperature measured by the temperature sensor, and on the relationship between temperature and amount of deformation stored in the table;

wherein the control unit is configured to drive the actuator according to the obtained amount of deformation to control the distance between the thermally assisted magnetic recording head and the disk, in order to avoid contact between the thermally assisted magnetic recording head and the disk, wherein the near-field transducer is supplied with light from an LD, and wherein the contact avoidance unit is configured to forcibly block or reduce the current supplied to the LD when the calculated amount of deformation exceeds the control range of the actuator.

* * * * *